United States Patent Office 3,238,227
Patented Mar. 1, 1966

3,238,227
EPOXY DERIVATIVES AND PROCESS OF PREPARING THE SAME
Samuel W. Tinsley and Donald L. MacPeek, South Charleston, W. Va., assignors to Union Carbide Corporation, a corporation of New York
No Drawing. Filed May 31, 1960, Ser. No. 32,519
11 Claims. (Cl. 260—348)

This invention relates to new epoxides which are derivatives of 3-oxatricyclo[3.2.1.0$^{2,4}$]octane and to the process of preparing these compounds.

The compounds to which this invention is directed may be represented by the general formula, as follows:

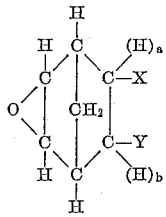

wherein $a$ and $b$ represent integers of 0 or 1; X represents a member selected from the group consisting of the monovalent radicals hydrogen, alkyl and haloalkyl and the divalent radicals methylene and methyleneoxy; Y represents a member selected from the group consisting of the monovalent radicals haloalkyl, alkenyloxy, epoxyalkyloxy, alkenyl, epoxyalkyl, epoxycycloalkyl, epoxycycloalkyloxy, epoxycycloalkylalkyloxy, epoxybicycloalkyloxy, alkenoyloxy, epoxyalkanoyloxy and epoxycycloalkanoyloxy and the divalent radicals methylene and methyleneoxy; with the proviso that $a$ and/or $b$ have a value of zero when X and/or Y are divalent radicals.

The compounds represented by the structural formula set forth above are known as 3-oxatricyclo[3.2.1.0$^{2,4}$]octane 6,7-disubstituted derivatives and 3 - oxatricyclo [3.2.1.0$^{2,4}$]octane 6-substituted derivatives. The system of nomenclature employed in naming these compounds is based on the Rules of the International Union of Chemistry as modified to date by the committee of Nomenclature, Spelling and Pronunciation of the American Chemical Society.

Due to the presence of the epoxy group

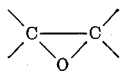

the novel compounds of this invention possess useful solvent properties. For example, they are compatible with many vinyl chloride and vinylidene chloride resins. Accordingly, the compounds of this invention can be used as plasticizers for these and other resins. By incorporating into the resin from about 5 to 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as poly(vinyl chloride), vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. The compounds are also useful in the preparation of synthetic lubricants, tanning agents and biological preparations.

Furthermore, the compounds of this invention are useful as intermediates in the preparation of a large number of new chemical compounds by virtue of the epoxy group which is capable of reacting with a large number of compounds possessing one or more active hydrogen atoms, such as phenols, alcohols, carboxylic acids, amides, amines, mercaptans and the like. These epoxides can also be polymerized, especially by Lewis acids, to form polymers useful for coatings and the like.

It is an object of this invention to provide new organic compounds which are suitable for use in the plastics and resin fields. A further object is to provide new compositions of matter comprising monoepoxy and polyepoxy derivatives of 3-oxatricyclo[3.2.1.0$^{2,4}$]octane. A further object is to provide novel polymers and copolymers containing epoxy groups. A further object is to provide new polymers which can be cross-linked through said epoxy groups. Another object is to provide processes for the preparation of the novel compositions of matter of this invention. These and other objects will readily become apparent to those skilled in the art in light of the teachings herein set forth.

In accordance with the process of the invention, the novel organic compounds are produced in high yields by the epoxidation of the olefinic linkages contained in the starting material containing the bicyclo[2.2.1]-2-heptene moiety. In the starting materials, where the only available double bond is in the bicyclo[2.2.1]-2-heptene ring, the epoxidation is effected quite easily. In the starting materials where more than one site of unsaturation is available to be epoxidized, it has been observed that epoxidation can occur selectively. For instance, it has been found that the rate of epoxidation in the double bonds of an alkenyl radical is generally slower compared to that of the double bonds in the bicycloheptene ring. Thus, by controlling the amounts of reactants, an essentially complete selectivity can be achieved in the preparation of various monoepoxides and diepoxides which fall within the scope of this invention.

The starting materials used to prepare the compounds of this invention are obtained by the well-known Diels-Alder reaction of cyclopentadiene with the appropriate dienophile to obtain the desired bicycloheptene derivative. The starting ethers of this invention can be prepared by the conventional Williamson synthesis wherein the sodium salt of a 5-hydroxybicyclo[2.2.1]-2-heptene is condensed with an appropriate unsaturated halide according to known methods. On the other hand, the starting material esters can be prepared by esterification of a 5-hydroxybicyclo[2.2.1]-2-heptene with the appropriate unsaturated acid. The unsaturated starting materials are then epoxidized to the desired compounds, within the scope of this invention, by the use of peracids such as peracetic acid, perbenzoic acid, monoperphthalic acid, performic acid, hydroperoxides and the like. The preferred form of the use of peracids in the process of this invention, is in an inert diluent such as ethyl acetate because of the ease of handling and the avoidance of hazards caused by the crystallization of the peroxide from solution. Other diluents which are non-reactive with the peroxide may be employed and include: acetone, methyl ethyl ketone, butyl acetate and the like. Peracetic acid is particularly well suited for the epoxidation of olefinic linkages since this epoxidation reaction can be carried out under relatively mild conditions and with a minimum of operating difficulty. For these reasons, the use of peracetic acid is more economical and more desirable for commercial application.

In one embodiment of the present invention, the epoxidation of the unsaturated starting materials is carried out at temperatures in the ranges of from −25° C. to 150° C. At the lower temperatures, the rate of epoxidation is slow while at the higher temperatures the rate is faster, necessitating precautions to prevent further reaction of the epoxide groups. In order to avoid undesired side reactions and to provide a suitable reduction rate, temperatures in the range of from 10° C. to 90° C. are preferable. In the practice of the invention, the unsaturated starting material is conveniently charged to a reaction vessel and the appropriate quantity of peracid such as peracetic acid is added. The mole ratio is not necessarily critical and can be varied over a wide range depending on whether the mono-, di-, or higher epoxy compounds are desired. The reaction is allowed to proceed for a time sufficient to consume approximately the theoretical quantity of peracid needed to effect epoxidation. The amount of peracid consumed can be determined by periodic tests for peracid. Usually from about one to about ten hours is sufficient for the reaction to be completed at the preferred temperature. It is preferred, although not absolutely necessary, to separate the by-product acid such as acetic acid from the epoxide rapidly, since the by-product acid may react with the epoxide to form undesired products, decreasing the overall yield. Finally the reaction mixture is subjected to conventional recovery procedures to isolate the reaction product. Extraction with a suitable solvent, continuous distillation or distillation under reduced pressures, all are applicable to the recovery of the epoxide product.

Another embodiment of the invention pertains to the hydrocarbon and halogenated hydrocarbon substituted 3-oxatricyclo[3.2.1.0$^{2,4}$]octanes corresponding to the general formula:

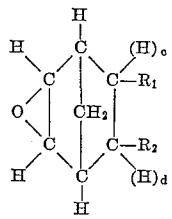

wherein $c$ and $d$ represents integers of 0 or 1; $R_1$ represents a member selected from the group consisting of hydrogen, alkyl, haloalkyl and methylene; $R_2$ represents a member selected from the group consisting of haloalkyl, alkenyl and methylene; with the proviso that $c$ and/or $d$ have a value of zero when $R_1$ and/or $R_2$ are methylene groups. $R_1$ and $R_2$, individually, contain no more than 18 carbon atoms.

The starting materials of this subclass are readily prepared by a Dield-Alder reaction of cyclopentadiene with dienophiles such as for example: 1,3-butadiene; 1,4-pentadiene; 1,5-hexadiene; allyl chloride; 1,4-dichloro-butene-2; 1,6-dichlorohexene-3; 1,8-dibromooctene-4; and the like.

The desired starting materials obtained are then subjected to epoxidation by a peracid to obtain the epoxides within the scope of the embodiment. A variation of the above described procedure is found in the unique preparation of 6-methylene-3-oxatricyclo[3.2.1.0$^{2,4}$]octane and 6,7-dimethylene-3-oxatricyclo[3.2.1.0$^{2,4}$]octane wherein the corresponding starting olefinic precursors, 5-chloromethylbicyclo[2.2.1]-2-heptene and 5,6-di(chloromethyl)-bicyclo[2.2.1]-2-heptene are epoxidized by a peracid to obtain the corresponding chloromethyl substituted 3-oxatricyclo[3.2.1.0$^{2,4}$]octanes and dehydrohalogenated, without the destruction of the epoxy group, to obtain the methylene and dimethylene derivatives of 3-oxatricyclo[3.2.1.0$^{2,4}$]octanes.

The representative compounds of this embodiment include among others:

6-vinyl-3-oxatricyclo[3.2.1.0$^{2,4}$]octane;
6-(2-propenyl)-3-oxatricyclo[3.2.1.0$^{2,4}$]octane;
6-(4-butenyl)-2-oxatricyclo[3.2.1.0$^{2,4}$]octane;
6-methylene-3-oxatricyclo[3.2.1.0$^{2,4}$]octane;
6,7,-dimethylene-3-oxatricyclo[3.2.1.0$^{2,4}$]octane;
6-chloromethyl-3-oxatricyclo[3.2.1.0$^{2,4}$]octane;

6,7-dichloromethyl-3-oxatricyclo[3.2.1.0$^{2,4}$]octane;
6,7-dichloroethyl-3-oxatricyclo[3.2.1.0$^{2,4}$]octane;
6,7-dibromopropyl-3-oxatricyclo[3.2.1.0$^{2,4}$]octane;
and the like.

An additional embodiment of this invention relates to epoxy substituted 3-oxatricyclo[3.2.1.0$^{2,4}$]octanes corresponding to the general formula:

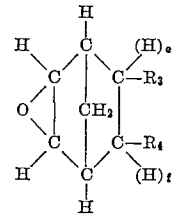

wherein $e$ and $f$ represent integers of 0 or 1; $R_3$ represents a member selected from the group consisting of hydrogen, methyleneoxy and alkyl containing from 1 to 18 carbon atoms; $R_4$ represents a member selected from the group consisting of methyleneoxy and an epoxyalkyl group containing from 2 to 18 carbon atoms represented by the formula ($C_nH_{2n-1}O$) wherein $C_n$ represents carbon atoms, $2n-1$ hydrogen atoms and one oxygen atom which is attached to vicinal carbon atoms; with the proviso that $e$ and/or $f$ have a value of zero when $R_3$ and/or $R_4$ are methyleneoxy radicals.

The term "methyleneoxy" as used herein represents a divalent radical of the structure

wherein the two available bonds are connected to the cyclic carbon atom in the 6 carbon position or in both the 6 and 7 carbon positions of the 3-oxatricyclo-[3.2.1.0$^{2,4}$]octane moiety. Thus, the methyleneoxy derivatives would be presented in the following formulae:

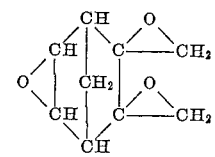

6,7-dimethylene-3-oxatricyclo-
[3.2.1.0$^{2,4}$]octane dioxide

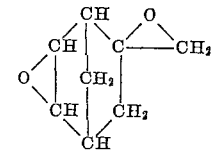

5,6-epoxy-4,7-methano-1-oxaspiro[2.5]octane

The starting materials of this subclass are readily prepared by Diels-Adler reaction of cyclopentadiene and appropriate dienophiles such as 1,3-butadiene, 1,4-pentadiene, 1,3-hexadiene, 2,5-octadiene, 3,8-undecadiene and the like. The desired starting materials obtained are then subjected to epoxidation by a peracid to obtain the epoxides within the scope of this embodiment. The methylene and dimethylene derivatives of 3-oxatricyclo [3.2.1.0$^{2,4}$]octane are prepared by the Diels-Alder reaction of cyclopentadiene and dienophiles such as 3-chloro-1-propene and 1,4-dichloro-2-butene producing 5-chloromethylbicyclo[2.2.1] - 2 - heptene and 5,6 - di(chloromethyl)bicyclo-[2.2.1]-2-heptene respectively. The chlorine substituted starting materials are epoxidized with a peracid to obtain the corresponding chloromethyl substituted 3-oxatricyclo[3.2.1.0$^{2,4}$]octanes and subsequently dehydrohalogenated, without the destruction of the epoxy group, to obtain the methylene and dimethylene derivatives of 3-oxatricyclo[3.2.1.0$^{2,4}$]octane which are further epoxidized to produce 5,6-epoxy-4,7methano-1-oxaspiro

[2.5]octane and 6,7-dimethylene-3-oxatricyclo[3.2.1.0$^{2,4}$] octane dioxide.

The representative compounds of this embodiment include, among others:

6-epoxyethyl-3-oxatricyclo[3.2.1.0$^{2,4}$]octane;
6-(2,3-epoxypropyl)-3-oxatricyclo[3.2.1.0$^{2,4}$]octane;
6-(3,4-epoxybutyl)-3-oxatricyclo[3.2.1.0$^{2,4}$]octane;
7-methyl-6-(2,3-epoxypentyl)-3-oxatricyclo[3.2.1.0$^{2,4}$] octane;
7-ethyl-6-(3,4-epoxybutyl)-3-oxatricyclo[3.2.1.0$^{2,4}$] octane;
7-ethyl-6-(4,5-epoxyheptyl)-3-oxatricyclo[3.2.1.0$^{2,4}$] octane;
7-heptyl-6-(5,6-epoxyhexyl)-3-oxatricyclo[3.2.1.0$^{2,4}$] octane;
7-hexyl-6-(8,9-epoxynonyl)-3-oxatricyclo[3.2.1.0$^{2,4}$] octane;
5,6-epoxy-4,7-methano-1-oxaspiro-[2.5]octane;
6,7-dimethylene-3-oxatricyclo[3.2.1.0$^{2,4}$]octane dioxide and the like.

A further embodiment of this invention pertains to epoxycyclohexyl substituted 3-oxatricyclo[3.2.1.0$^{2,4}$]octanes corresponding to the general formula:

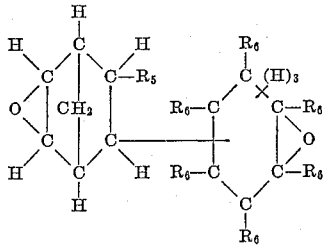

wherein $R_5$ represents hydrogen and alkyl radicals containing from 1 to 18 carbon atoms and $R_6$ represents hydrogens and/or alkyl radicals containing from 1 to 12 carbon atoms.

The precursors, 5-(cyclohexenyl)bicyclo[2.2.1]-2-heptenes of this embodiment, are prepared by the Diels-Alder reaction wherein cyclopentadiene is caused to react with vinyl cyclohexene and its alkyl substituted derivatives. The starting materials obtained are then subjected to the epoxidation process to obtain the desired epoxides of this embodiment.

The representative compounds of this embodiment include, among others:

6-(3,4-epoxycyclohexyl)-3-oxatricyclo[3.2.1.0$^{2,4}$]octane;
6-(5-methyl-3,4-epoxycyclohexyl)-3-oxatricyclo [3.2.1.0$^{2,4}$]octane;
6-(6-propyl-3,4-epoxycyclohexyl)-3-oxatricyclo [3.2.1.0$^{2,4}$]octane;
6-(2-n-hexyl-3,4-epoxycyclohexyl)-3-oxatricyclo [3.2.1.0$^{2,4}$]octane;
6-(3-methyl-3,4-epoxycyclohexyl)-3-oxatricyclo [3.2.1.0$^{2,4}$]octane;
6-(5-dodecyl-3,4-epoxycyclohexyl)-3-oxatricyclo [3.2.1.0$^{2,4}$]octane; and the like.

A further embodiment of this invention relates to substituted ethers of 3-oxatricyclo[3.2.1.0$^{2,4}$]octanes corresponding to the general formula:

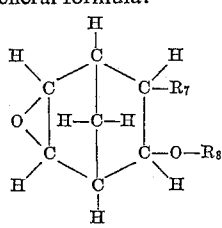

wherein $R_7$ represents hydrogen and alkyl radicals containing from 1 to 18 carbon atoms and wherein $R_8$ represents an alkenyl group containing not more than 18 carbon atoms.

The starting ethers of this embodiment are prepared by the condensation of the sodium salt of 5-hydroxybicyclo[2.2.1]-2-heptene with the appropriate unsaturated organic halide such as, e.g., allyl chloride, methallyl chloride, crotyl chloride, 3-hexenyl bromide, 7-dodecenyl chloride, and the like. The unsaturated starting ethers of this embodiment are then subjected to epoxidation by a peracid to obtain the epoxides within the scope of this embodiment.

The representative compounds of this embodiment include among others:

6-(methyllyloxy)-3-oxatricyclo[3.2.1.0$^{2,4}$]octane;
6-(7-dodecenyloxy)-3-oxatricyclo[3.2.1.0$^{2,4}$]octane;
6-(crotyloxy)-3-oxatricyclo[3.2.1.0$^{2,4}$]octane;
6-(3-hexenyloxy)-3-oxatricyclo[3.2.1.0$^{2,4}$]octane;
and the like.

An additional embodiment of this invention pertains to epoxyalkyloxy-3-oxatricyclo[3.2.1.0$^{2,4}$]octanes corresponding to the general formula:

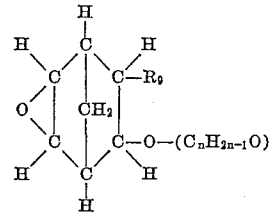

wherein $R_9$ represents hydrogen and alkyl radicals containing from 1 to 18 carbon atoms wherein the group $(C_nH_{2n-1}O)$ represents an epoxyalkyl group containing from 3 to 18 carbon atoms, composed of $n$ carbon atoms and $2n-1$ hydrogen atoms and one oxygen atom which is attached to vicinal carbon atoms, said carbon atoms separated from the ether linkage by at least one carbon atom.

The precursors, 5-alkenyloxybicyclo[2.2.1]-2-heptenes of this embodiment, are prepared by the condensation (Williamson synthesis) of the sodium salt of 5-hydroxybicyclo[2.2.1]-2-heptene with at least one mole of the appropriate alkenyl halide such as, e.g., allyl chloride, methallyl chloride, crotyl chloride, 3-hexenylbromide, 5-octenyl chloride, 7-dodecenyl bromide, 12-octadecenyl chloride and the like. The unsaturated starting ethers of this embodiment are then subjected to epoxidation by a peracid to obtain the epoxides within the scope of this embodiment.

The representative compounds of this embodiment include, among others:

6-(2,3-epoxypropoxy)-3-oxatricyclo[3.2.1.0$^{2,4}$]octane;
6-(2-methyl-2,3-epoxypropoxy)-3-oxatricyclo[3.2.1.0$^{2,4}$] octane;
6-(2,3-epoxybutoxy)-3-oxatricyclo[3.2.1.0$^{2,4}$]octane;
6-(3,4-epoxyhexoxy)-3-oxatricyclo[3.2.1.0$^{2,4}$]octane;
6-(5,6-epoxyoctoxy)-3-oxatricyclo[3.2.1.0$^{2,4}$]octane;
6-(7,8-epoxydodecoxy)-3-oxatricyclo[3.2.1.0$^{2,4}$]octane;
6-(12,13-epoxyoctadecoxy)-3-oxatricyclo[3.2.1.0$^{2,4}$] octane; and the like.

A further embodiment of this invention pertains to epoxycycloalkyl ether, epoxycycloalkylalkyl ethers, and epoxybicycloalkyl ethers of 3-oxatricyclo[3.2.1.0$^{2,4}$]octanes corresponding to the general formulae:

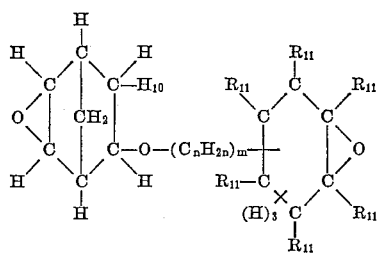

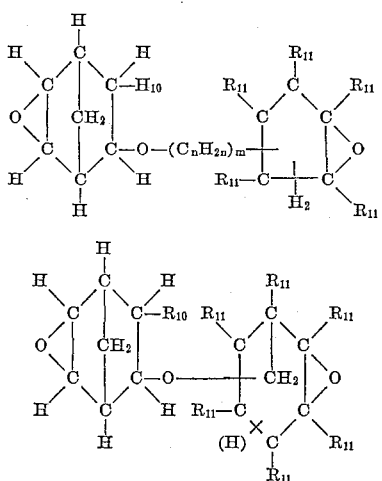

wherein $R_{10}$ represents hydrogen and alkyl radicals containing from 1 to 18 carbon atoms, and $R_{11}$ represents hydrogens and/or alkyl radicals containing from 1 to 12 carbon atoms and $C_n$ represents carbon atoms, $H_{2n}$ represents hydrogen atoms; where $n$ is an integer in the range of 1 to 11 and $m$ represents an integer in the range from 0 to 1.

The starting ethers of this embodiment are prepared according to the Williamson synthesis wherein the sodium salt of 5-hydroxybicyclo[2.2.1]-2-heptene is condensed with an appropriate cycloalkenyl or bicycloakenyl halide. Typical cyclopentenyl halides used to prepare the starting materials include among others:

1-chloro-2-cyclopentene,
1-chloro-4-methyl-2-cyclopentene,
1-chloro-5-ethyl-2-cyclopentene,
1-chloro-3-methyl-2-cyclopentene,
1-chloro-4-hexyl-2-cyclopentene,
1-chloromethyl-2-cyclopentene,
1-chloromethyl-4-methyl-2-cyclopentene and the like.

Typical cyclohexenyl halides used to prepare the starting materials include among others:

1-chloro-3-cyclohexene,
1-chloro-5-ethyl-3-cyclohexene,
1-chloro-3-methyl-3-cyclohexene,
1-chloro-4-pentyl-3-cyclohexene,
1-chloro-6-hexyl-3-cyclohexene,
1-chloromethyl-3-cyclohexene,
1-chloromethyl-5-ethyl-3-cyclohexene and the like.

Typical 5-halobicyclo[2.2.1]-2-heptenes used to prepare the starting materials include among others:

5-chloro-bicyclo[2.2.1]-2-heptene,
5-chloro-3-hexylbicyclo[2.2.1]-2-heptene,
5-chloro-6-methylbicyclo[2.2.1]-2-heptene,
2-chloro-6-ethylbicyclo[2.2.1]-2-heptene and the like.

The starting unsaturated ethers of this embodiment were then subjected to epoxidation by a peracid to obtain the epoxides within the scope of this embodiment.

The representative compounds of this embodiment include among others:

6-(2,3-epoxycyclopentyloxy)-3-oxatricyclo[3.2.1.0$^{2,4}$]octane;
6-(2,3-epoxycyclopentylmethoxy)-3-oxatricyclo[3.2.1.0$^{2,4}$]-octane;
6-(2,3-epoxy-4-methylcyclopentyloxy)-3-oxatricyclo-[3.2.1.0$^{2,4}$]octane;
6-(2,3-epoxy-5-ethylcyclopentyloxy)-3-oxatricyclo-[3.2.1.0$^{2,4}$]octane;
6-(2,3-epoxy-3-methylcyclopentyloxyl)-3-oxatricyclo[3.2.1.0$^{2,4}$]octane;
6-(2,3-epoxy-4-hexylcyclopentyloxy)-3-oxatricyclo[3.2.1.0$^{2,4}$]octane;
6-(2,3-epoxy-4-hexylcyclopentylmethoxy)-3-oxatricyclo[3.2.1.0$^{2,4}$]octane;
6-(3,4-epoxycyclohexyloxy)-3-oxatricyclo[3.2.1.0$^{2,4}$]octane;
6-(3,4-epoxycyclohexylmethoxy)-3-oxatricyclo[3.2.1.0$^{2,4}$]octane;
6(3,4-epoxy-5-ethylcyclohexyloxy)-3-oxatricyclo[3.2.1.0$^{2,4}$]octane;
6-(3,4-epoxy-3-methylcyclohexyloxy)-3-oxatricyclo[3.2.1.0$^{2,4}$]octane;
6-(3,4-epoxy-4-butylcyclohexyloxy)-3-oxatricyclo[3.2.1.0$^{2,4}$]octane;
6-(3,4-epoxy-6-hexylcyclohexyloxy)-3-oxatricyclo[3.2.1.0$^{2,4}$]octane;
6-(3,4-epoxy-6-hexylcyclohexylmethoxy)-3-oxatricyclo[3.2.1.0$^{2,4}$]octane;
6-(3-oxatricyclo[3.2.1.0$^{2,4}$]octane-6-yloxy)-3-oxatricyclo[3.2.1.0$^{2,4}$]octane;
6-(7-hexyl-3-oxatricyclo[3.2.1.0$^{2,4}$]octan-6-yloxy)-3-oxatricyclo[3.2.1.0$^{2,4}$]octane;
6-(2-methyl-3-oxatricyclo[3.2.1.0$^{2,4}$]octan-6-yloxy)-3-oxatricyclo[3.2.1.0$^{2,4}$]octane;
6-(1-ethyl-3-oxatricyclo[3.2.1.0$^{2,4}$]octan-6-yloxy)-3-oxatricyclo[3.2.1.0$^{2,4}$]octane, and the like.

Another embodiment of this invention pertains to ester derivatives of 6-hydroxy-3-oxatricyclo[3.2.1.0$^{2,4}$]octane corresponding to the general formula:

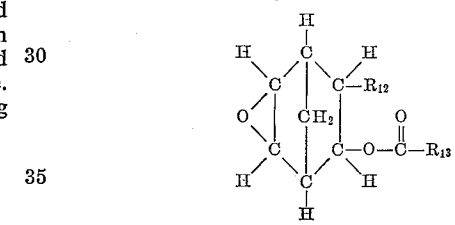

wherein $R_{12}$ represents hydrogen and alkyl radicals containing from 1 to 18 carbon atoms and $R_{13}$ represents an alkenyl group containing from 1 to 17 carbon atoms.

The starting esters of this embodiment are prepared according to the well known esterification process by the reaction of 5-hydroxybicyclo[2.2.1]-2-heptene with an unsaturated acid such as e.g., acrylic acid, crotonic acid, tiglic acid, undecylenic acid, oleic acid and the like. The unsaturated esters of this embodiment are then subjected to epoxidation by a peracid to obtain the epoxides within the scope of this embodiment.

The representative compounds of this embodiment include, among others:

6-(3-oxatricyclo[3.2.1.0$^{2,4}$]octyl) acrylate;
6-(3-oxatricyclo[3.2.1.0$^{2,4}$]octyl) crotonate;
6-(3-oxatricyclo[3.2.1.0$^{2,4}$]octyl) undecylenate;
6-(3-oxatricyclo[3.2.1.0$^{2,4}$]octyl) oleate;
6-(3-oxatricyclo[3.2.1.0$^{2,4}$]octyl) linoleate;
and the like.

A further embodiment of this invention pertains to epoxyalkyl esters of 6-hydroxy-3-oxatricyclo[3.2.1.0$^{2,4}$] octane corresponding to the general formula:

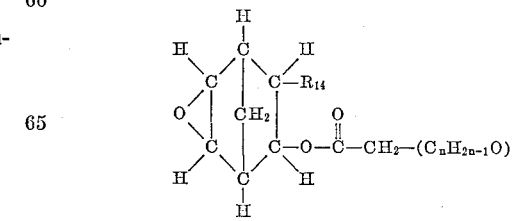

wherein $R_{14}$ represents hydrogen and alkyl radicals containing from 1 to 18 carbon atoms and the group $(C_nH_{2n-1}O)$ represents an epoxyalkyl group containing from 2 to 16 carbon atoms and composed of $n$ carbon atoms, $2n-1$ hydrogen atoms, and one oxygen atom which is attached to vicinal carbon atoms.

The starting esters of this embodiment are prepared according to the well known esterification process by the reaction of 5-hydroxybicyclo[2.2.1]-2-heptene with the appropriate unsaturated acid such as e.g., 3-butenoic acid, 4-pentenoic acid, 3-pentenoic acid, 5-hexenoic acid, 7-octenoic acid, 11-dodecenoic acid, 17-octadecenoic acid, oleic acid and the like. The starting esters of this embodiment are then subjected to epoxidation by a peracid to obtain the epoxides within the scope of this embodiment.

The representative compounds of this embodiment include, among others:

6-(3-oxatricyclo[3.2.1.0$^{2,4}$]octyl) 3,4-epoxybutanoate;
6-(3-oxatricyclo[3.2.1.0$^{2,4}$]octyl) 4,5-epoxypentanoate;
6-(3-oxatricyclo[3.2.1.0$^{2,4}$]octyl) 3,4-epoxybutanoate;
6-(3-oxatricyclo[3.2.1.0$^{2,4}$]octyl) 5,6-epoxyhexanoate;
6-(3-oxatricyclo[3.2.1.0$^{2,4}$]octyl) 7,8-epoxyoctanoate;
6-(3-oxatricyclo[3.2.1.0$^{2,4}$]octyl) 11,12-epoxydodecanoate;
6-(3-oxatricyclo[3.2.1.0$^{2,4}$]octyl 17,18-epoxyoctadecanoate;
6-(3-oxatricyclo[3.2.1.0$^{2,4}$]octyl) 9,10-epoxystearate;
and the like.

An additional embodiment of this invention pertains to epoxycycloalkyl esters of 6-hydroxy-3-oxatricyclo[3.2.1.0$^{2,4}$]octane corresponding to the general formulae:

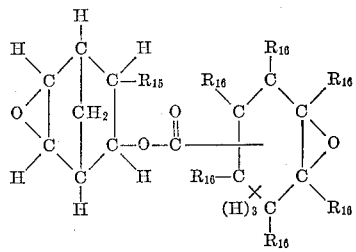

and

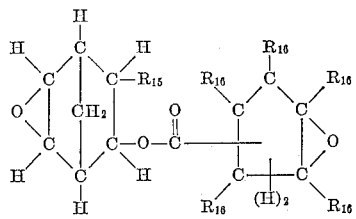

wherein $R_{15}$ represents hydrogen and alkyl radicals containing from 1 to 18 carbon atoms and $R_{16}$ represents hydrogens and/or alkyl radicals containing no more than 11 carbon atoms.

The starting esters of this embodiment are prepared according to the well known esterification process by the reaction of 5-hydroxybicyclo[2.2.1]-2-heptene with the appropriate cycloalkenecarboxylic acid such as, e.g., 5-butyl-2-cyclopentenecarboxylic acid, 4-hexyl-2-cyclopentenecarboxylic acid, 3-cyclohexenecarboxylic acid, 4-methyl-3-cyclohexenecarboxylic acid, 6-butyl-3-cyclohexenecarboxylic acid, 5-hexyl-3-cyclohexenecarboxylic acid, and the like. The starting unsaturated esters of this embodiment are then subjected to epoxidation by a peracid to obtain the epoxides within the scope of this embodiment.

The representative compounds of this embodiment include, among others:

6-(3-oxatricyclo[3.2.1.0$^{2,4}$]octyl) 2,3-epoxycyclopentanecarboxylate;
6-(3-oxatricyclo[3.2.1.0$^{2,4}$]octyl) 4-methyl-2,3-epoxycyclopentanecarboxylate;
6-(3-oxatricyclo[3.2.1.0$^{2,4}$]octyl) 5-butyl-2,3-epoxycyclopentanecarboxylate;
6 (3-oxatricyclo[3.2.1.0$^{2,4}$]octyl) 4-hexyl-2,3-epoxycyclopentanecarboxylate;
6-(3-oxatricyclo[3.2.1.0$^{2,4}$]octyl) 3,4-epoxycyclohexanecarboxylate;
6-(3-oxatricyclo[3.2.1.0$^{2,4}$]octyl) 5-hexyl-3,4-epoxycyclohexanecarboxylate;
6-(3-oxatricyclo[3.2.1.0$^{2,4}$]octyl) 6-butyl-3,4-epoxycyclohexanecarboxylate, and the like.

The particular ability of the peracetic acid and other peracids, in general, to give a satisfactory reaction and acceptable yields of epoxides is not unusual for it has been long recognized that peracids occupy somewhat a unique position in the field of oxidizing reagents since they are able to effect several types of specific chemical transformations with acceptable efficiencies, while other powerful oxidizing agents, such as potassium permanganate, are not. One such type of chemical transformation peculiar to the peracids is that type of reaction which makes available the compounds of this invention, that is, the oxidation of unsaturated organic compounds to produce the corresponding epoxides.

The extent of epoxidation can easily be followed by subjecting the reaction mixture to an analysis for unreacted epoxidant. The analysis for determining epoxidant, such a peracetic acid content, can be performed, for example, by introducing 1 to 15 grams of a sample of unknown epoxidant concentration into a flask containing a mixture of 60 milliliters of glacial acetic acid and 5 milliliters of a saturated potassium iodide solution. The flask is swirled to mix the solutions and then titrated immediately with a 0.1N aqueous sodium thiosulfate solution to a colorless end point. From the titration data thus obtained, a determination of epoxidant content can be made.

Copolymers of the 3-oxatricyclo[3.2.1.0$^{2,4}$]octane 6,7-di-substituted compositions and 3-oxatricyclo[3.2.0$^{2,4}$]octane 6-substituted compositions of this invention, containing terminal unsaturation, can be prepared by the reaction of said disubstituted ethers and esters with a polymerizable ethylenically unsaturated compound. Examples of said ethylenically unsaturated compounds include vinyl and vinylidene halides such as vinyl chloride and vinylidene chloride; acrylic acids, esters, nitriles, and amides such as acrylic acid, methacrylic acid, methyl methacrylate, acrylonitrile, and acrylamide; vinyl carboxylates such as vinyl acetate, vinyl butyrate, and the like. The polymerization conditions are not critical and in general from about 0.01 to about 5 percent of a free radical producing initiator by weight of the total polymerizable components will give satisfactory results. The particular application of the resulting copolymer will be determinative of the relative proportions of the monomers used. Thus, for example, the unsaturated 6-(3-oxatricyclo[3.2.1.0$^{2,4}$]octyl) acrylate can be copolymerized in a suitable medium, such as dry acetone, with vinyl chloride in the presence of diacetyl peroxide as a polymerization initiator. The resulting thermoplastic resin can then be cross-linked through the epoxy group. Cross-linking can be effected by dissolving the copolymerized resin in a suitable solvent such as toluene and methyl isobutyl ketone, adding thereto from about 0.1 to about 3 percent of phosphoric acid or diethylenetriamine by weight of solution, and heating the mixture. On the other hand, by reversing the sequence of polymerization steps outlined above, a different class of useful copolymers may be obtained.

The compounds of the instant invention can also be homopolymerized through the unsaturation contained in the alcohol and acid moieties of the esters and ethers and the resulting polymer also cross-linked through the epoxy group. For the compounds with no terminal unsaturation, the ethers and esters can be homopolymerized directly through the epoxy group itself. Thus, 6-(methylglycidyloxy)-3-oxatricyclo[3.2.1.0$^{2,4}$]octane, for example, can be homopolymerized by heating in the presence of a boron trifluoridemonoethylamine complex, to give a viscous polymer.

The diepoxy monomers of this invention can be used in the preparation of polymerizable, curable and polymerized, cured compositions by the reaction of said monomers alone or with appropriate hardeners such as polycarboxylic acid compounds, polycarboxylic acid anhydrides, polyols, polyfunctional amines and combinations thereof in the presence or absence of a catalyst. Typical catalysts which can be added if desired to accelerate the rate of curing or polymerization are base and acid catalysts and particularly the acid catalysts of the Lewis acid type. Typical Lewis acid type catalysts include boron trifluoride, stannic chloride, zinc chloride, aluminum chloride, ferric chloride and the like. Complexes of the various Lewis acids, such as etherates, and aminates of boron trifluoride are also effective. Other acid catalysts which can be employed include sulfuric acid, phosphoric acid, perchloric acid, polyphosphoric acid and various sulfonic acids such as para-toluenesulfonic acid and benzenesulfonic acid. Typical strong alkalis include the alkali metal hydroxides, e.g., sodium hydroxide and potassium hydroxide, and quaternary ammonium compounds, e.g., benzyltrimethylammonium hydroxide, tetramethylammonium hydroxide and the like. Catalysts in amounts ranging up to 5.0 weight percent based on the weight of the epoxide used can be added at any time prior to curing or not at all, as desired. Higher catalysts concentrations above this range are also effective, although concentrations of 5.0 weight percent and below have been found to be adequate.

Curing can be carried out by maintaining the curable compositions at temperatures from about 25° C. to 250° C. Temperatures higher than 250° C. can be used, although some discoloration, which may not be desired in the final product, may result. The time for effecting a complete cure can be varied from several minutes to several hours.

The curable compositions obtained can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our curable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like. These polymerizable compositions are particularly useful in the manufacture of large tools as, for example, used in the automobile industries wherein the fluid nature of our compositions simplifies the construction of such tools. These compositions are particularly useful in the potting of electrical components wherein it may be desired to incorporate in the potting composition a heat conductive metal such as copper or aluminum.

The ratios, in which the added hardeners can be reacted with the epoxides of this invention are illustrated by the following ranges:

Polycarboxylic acid compounds—0.1 and lower, to 1.5 and higher, carboxyl equivalents per epoxy equivalent
Polycarboxylic acid anhydrides—0.1 and lower, to 4 and higher, carboxyl equivalents per epoxy equivalent
Polyols—0.01 and lower to 1.5 and higher, hydroxyl equivalents per epoxy equivalent
Polyfunctional amines—0.2 and lower, to 5.0 and higher, amino hydrogen of the amine for each epoxy equivalent The compositions of the epoxy resins have been described in terms of epoxy equivalents, hydroxyl equivalents, carboxyl equivalents, and aminohydrogen. By the term "epoxy equivalent" is meant the number of epoxy groups contained by a molecule of an

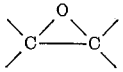

epoxide of this invention. The term "carboxyl equivalent" is intended to mean the number of carboxyl groups (—COOH) contained in a molecule of a polycarboxylic acid compound or the number of potential carboxyl groups in a molecule of a polycarboxylic acid anhydride. The term "hydroxyl equivalent" is intended to mean the number of hydroxyl groups (—OH) contained in a molecule of polyol. The term "amino hydrogens" is intended to mean the number of active amino hydrogen atoms contained in a molecule of a poly-functional amine.

By the term "polycarboxylic acid," as used herein, is meant a compound having two or more carboxyl groups to the molecule. The polycarboxylic acid compounds which can be used in preparing the novel epoxy compositions using the epoxides of this invention include aliphatic, aromatic, and cycloaliphatic polycarboxylic acids such as oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, alpha-phenylfumaric acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,24-benzenetricarboxylic acid, 1,3,5-benzenetricarboxylic acid, 3-hexene-2,2,3,4-tetracarboxylic acid, 1,2,3,4-benzenetetracarboxylic acid 1,2,3,5-benzenetetracarboxylic acid, benzenepentacarboxylic acid, benzenehexacarboxylic acid and the like.

Also, as polycarboxylic acids useful in the polymerizable compositions there are included compounds containing ester groups in addition to two or more carboxyl groups which can be termed "polycarboxy polyesters" of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxyl groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterification reaction should contain more carboxyl groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolethane, hexane-1,2,6-triol, 1,1,1-trimethylolpropane, and the ethylene oxide and propylene oxide adducts thereof; tetrahydric compounds, such as pentaerythritol, diglycerol, and the like; and higher polyhydric compounds such as pentaglycerol, dipentaerytritol, polyvinyl alcohols and the like. The mole ratios in which the polycarboxylic acid or anhydride can be reacted with polyhydric alcohols in preparing polycarboxylic polyesters useful in the compositions are those which provide polyesters having more than one carboxyl group per molecule.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichlormaleic anhydride, itaconic anhydride, citraconic anhydride, hexahydrophthalic anhydride, hexachlorophthalic anhydride, tetrahydrophthalic anhydride, methyltetrahydrophthalic anhydride, tetrachlorphthalic anhydride, chlorendic anhydride, tetrabromophthalic anhydride, tetraiodophthalic anhydride, phthalic anhydride, 4-nitrophthalic anhydride, naphthalic anhydride, polymeric dicarboxylic acid anhydrides, or mixed polymeric dicarboxylic acid anhydrides such as those prepared by the auto-condensation of dicarboxylic acids, for example, adipic acid, glutaconic acid, allylmalonic acid, 1,2-cyclohexanedicarboxylic acid, phthalic acid, isophthalic acid, 1,1,5-pentanetricarboxylic acid and the like.

By the term "polyol" is meant an organic compound having at least two hydroxyl groups which are alcoholic hydroxyl groups, phenolic hydroxyl groups or both alcoholic and phenolic hydroxyl groups. Representative polyols which can be employed include ethylene glycol; polyethylene glycols; propylene glycol; polypropylene glycols; butanediols; 2-ethyl-1,3-hexanediol; 12,13-tetracosanediol; glycerol; sorbitol; polyvinyl alcohols; cyclohexanediols; cyclopentanediols; trimethylolphenol; and polyhydric phenols such as dihydroxytoluenes, resorcinol, bis(4-hydroxyphenyl)-2,2-propane, bis(4-hydroxyphenyl)methane, the polyhydric phenolformaldehyde condensation products and the like.

By the term "polyfunctional amines" as used herein, is meant an amine having at least two active amino hydrogen atoms which can be on the same nitrogen or on different nitrogen atoms. Polyfunctional amines are typified by the aliphatic primary amines such as ethylamine, isobutylamine, monoethanolamine, beta-alanine; amides, e.g., formamide, propionamide, stearamides and the like; aromatic primary amines such as aniline, para-toluidine and the like; heterocyclic primary amines such as, N-(aminoethyl)morpholine, N-(aminopropyl)morpholine and the like; the aliphatic polyamines, such as ethylenediamine, butylenediamines, decylenediamines, guanidine and the like; aromatic polyamines, such as meta-, ortho-, and para-phenylenediamines, 1,4-naphthalenediamine, 3,3'-diphenyldiamine, alpha,alpha'-bi-paratoluidine, para,-para'-sulfonyldianiline and the like; heterocyclic polyamines, such as piperazine, 2,5-dimethylpiperazine, melamine, 2,4-diamino-5-(aminoethyl)pyrimidine; and the polyalkylene polyamines, in particular, the polyethylene polyamines and polypropylene polyamines, such as diethylenetriamine, triethylenetetramine and the like. Other polyfunctional amines include N-hydroxypropyldiethylenetriamine, N-hydroxyethylpropylenediamine, N-hydroxyethyldipropylenetriamine and the like.

The following examples illustrate the best mode presently contemplated for the preparation of the compounds of this invention.

*Example I.—Preparation of 6-chloromethyl-3-oxatricyclo-[3.2.1.0$^{2,4}$]octane*

A weight of 570 grams (4.0 moles) of 5-chloromethyl-bicyclo[2.2.1]-2-heptene was placed in a reaction flask equipped with a stirrer, thermometer, and addition funnel. After heating the olefin to 40–45° C., a weight of 1175 grams (4.4 moles) of a 28.5 percent solution of peracetic acid in ethyl acetate was added over a 90 minute period. After another 90 minutes, analyses for remaining peracid showed that 98.4 percent of the available olefin had been converted to epoxide. Then the reaction mixture was slowly fed into a still system containing refluxing ethyl benzene under reduced pressure. In this way, the low-boiling components of the reaction mixture, i.e., ethyl acetate, and acetic acid as the ethyl benzene azeotrope were removed. Continued reduced pressure distillation gave 550 grams of 6-chloromethyl-3-oxatricyclo[3.2.1.0$^{2,4}$]-octane at a boiling point of 70° C. at 0.2 millimeters Hg ($n$ 30/$D$=1.5014).

*Analysis.*—Calcd. for C: 60.70%. Found 61.4%. Calcd. for H: 6.98%. Found: 7.08%. This represented a yield of 86.9 percent of the theoretical amount.

*Example II.—Preparation of 6-methylene-3-oxatricyclo-[3.2.1.0$^{2,4}$]octane*

A weight of 317 grams (2.0 moles) of 6-chloromethyl-3-oxatricyclo[3.2.1.0$^{2,4}$]octane was fed under reduced pressure (70 to 75 millimeters Hg) into a still kettle containing a solution of 394 grams of 85 percent potassium hydroxide in 1200 grams of ethylene glycol. At kettle temperatures between 125 and 190° C., a two-phase distillate was collected at the still head at temperatures between 87° C. and 117° C. The water phase or the crude distillate was removed and the organic layer refractionated to give 97 grams of 6-methylene-3-oxatricyclo[3.2.1.0$^{2,4}$]octane at a boiling point of 47° C. at 9.4 millimeters Hg ($n$ 30/$D$=1.4909. Analysis by the pyridine hydrochloride method indicated an epoxide purity of 96 percent, infrared spectrum was consistent with proposed structure, i.e., oxirane and methylene functions on a bicyclic system). This represented a yield of 39.5 percent.

Similar operations at lower pressure (50 millimeters Hg) during the addition phase and extraction of the remaining reaction mixture with ether gave improved yields (61.1 percent) and allowed recovery (23.1 percent) of unconverted starting material or a yield of 79.2 percent based on converted starting material.

*Example III.—Preparation of 5-methylenebicyclo[2.2.1]-2-heptene*

A weight of 427.5 grams (3.0 moles) of 5-chloromethylbicyclo[2.2.1]-2-heptene was fed into a stirred solution of 593 grams (9.0 moles) of 85 percent potassium hydroxide in 1200 grams of ethylene glycol at 145° C. at atmospheric pressure. A mixture of water and an organic product was taken off at a still head attached through a short packed column, to the reaction vessel. At a kettle temperature of 190° C. after an hour beyond the feed period (which required 1 hour) no further material distilled from the system. The crude organic material was dried and distilled to provide 131 grams of 5-methylenebicyclo[2.2.1]-2-heptene at a boiling point of 116° C. at atmospheric pressure ($n$ 30/$D$=1.4802).

*Example IV.—Alternate preparation of 6-methylene-3-oxatricyclo[3.2.1.0$^{2,4}$]octane*

A weight of 212 grams (2.0 moles) of 5-methylenebicyclo[2.2.1]-2-heptene was placed in a reaction vessel equipped with a stirrer, addition funnel, and thermometer. At 5° C. to 10° C., a weight of 272 grams (1.0 mole) of a 27.7 percent solution of a peracetic acid in ethyl acetate was added over a 2.5 hour period. A short time later (20 minutes) analyses showed that all of the available peracid had been consumed. Low pressure azeotropic distillation of the reaction mixture then permitted rapid removal of acetic acid. Continued distillation gave 5.3 grams of 6-methylene-3-oxatricyclo[3.2.1.0$^{2,4}$]octane at a boiling point of 53° C. to 54° C. at 11 millimeters Hg, which was identical to the material produced by dehydrohalogenation of 6-chloromethyl-3-oxatricyclo[3.2.1.0$^{2,4}$]-octane (Example II). By this route the yield of product was 43.5 percent. Unconverted starting material was recovered as a forerun.

*Example V.—Preparation of 5,6-epoxy-4,7-methano-1-oxaspiro[2.5]octane*

A weight of 106 grams 1.0 mole) of 5-methylenebicyclo-[2.2.1]-2-heptene was heated in a conventional epoxidation system to 45° C. and treated with 607 grams 2.0 moles) of a 25.1 percent solution of peracetic acid in ethyl acetate over a 2-hour period. One houh later, analyses showed that 98.7 percent of the available peracid had been consumed. The reaction mixture was then rapidly distilled at reduced pressure to remove ethyl acetate and acetic acid from the product mixture. Continued distillation gave 111 grams of 5,6-epoxy-4,7-methano-1-oxaspiro[2.5]octane at a boiling point of 56° C. at 0.9 millimeters Hg ($n$ 30/$D$=1.4900). Analyses by the pyridine hydrochloride method established the product purity as 98.1 percent. Analyses for carbon and hydrogen showed—calcd. for C: 69.54%; H, 7.30%. Found: C, 69.57%; H, 7.27%. Thus a yield of 80 percent of the desired product was realized.

*Example VI.—Preparation of 5,6-di(chloromethyl)bicyclo[2.2.1]-2-heptene*

A charge consisting of 1980 grams (15 moles) of dicyclopentadiene and 3750 grams (30 moles) of 1,4-dichlorobutene-2 was placed in a 2-gallon glass lined autoclave and heated under autogenous pressure for 8 hours at 189° C. Then the reaction mixture with withdrawn and quickly flash distilled away from residue at reduced pressure. Redistillation gave 1779 grams of 5,6-di(chloromethyl)bicyclo[2.2.1]-2-heptene at a boiling point of 75° C. at 0.03 millimeters Hg ($n$ 30/$D$=1.5118. Analysis for carbon and hydrogen—calcd: C, 56.60%; H, 6.28%. Found: C, 56.27%; H, 6.46%. This represented a yield of 33.4 percent of the theoretical).

*Example VII.—Preparation of 5,6-dimethylenebicyclo[2.2.1]-2-heptene*

A weight of 382 grams (2.0 moles) of 5,6-di(chloromethyl)-bicyclo[2.2.1]-2-heptene was fed into a still kettle containing a solution of 790 grams of 85 percent potassium hydroxide in 1200 grams of ethylene glycol. The kettle was maintained at 150 to 200$ C. during the feed operation which required 1.5 hours. During this period, crude 5,6-dimethylenebicyclo[2.2.1]-2-heptene was taken off at the still head at atmospheric pressure. Redistillation at reduced pressure of the dried, crude product gave pure 5,6-dimethylenebicyclo[2.2.1]-2-heptene at a boiling point of 30° C. at 10 millimeters Hg ($n$ 30/$D$=1.5129). Analysis for carbon and hydrogen—calcd. for C, 91.4%; H, 8.53%. Found: C, 91.42%; H, 8.21%. In all, a yield of 156 grams or 66.4 percent of the theoretical amount was obtained.

*Example VIII.—Preparation of 6,7-di(chloromethyl)-3-oxatricyclo[3.2.1.0$^{2,4}$]octane*

A weight of 191 grams (1.0 mole) of 5,6-di(chloromethyl)-bicyclo[2.2.1]-2-heptene was allowed to react in the usual way (see Example I) with 291 grams (1.1 mole) of a 28.5 percent solution of peracetic acid in ethyl acetate. A feed period of 2 hours was followed by an additional reaction period of 2.5 hours, at which time analyses for unspent peracid indicated a conversion of 97.7 percent had been reached. Reduced pressure fractionation gave 177 grams of 6,7 - di(chloromethyl) - 3 - oxatricyclo [3.2.1.0$^{2,4}$]octane at a boiling point of 106° C. at 0.8 millimeter Hg ($n$ 30/$D$=1.5207). Analysis for carbon, hydrogen and chlorine, calcd.: for C, 52.19%; H, 5.84%; Cl, 34.24%. Found: C, 52.75%; H, 6.02%; Cl, 34.15%. This represented a yield of 86.5 percent of the desired product.

*Example IX.—Preparation of 6,7-dimethylene-3-oxatricyclo[3.2.1.0$^{2,4}$]octane*

A weight of 379 grams (1.83 moles) of 6,7-di(chloromethyl)-3-oxatricyclo[3.2.1.0$^{2,4}$]octane was fed into a solution of 362 grams of 85 percent potassium hydroxide in 1000 grams of ethylene glycol at 120 to 135° C. over a 5-hour period. Following the procedure shown in Example II for the related monochloromethyl compound, there was obtained on final distillation of the crude product a weight of 151 grams of 6,7-dimethylene-3-oxatricyclo[3.2.1.0$^{2,4}$]octane at a boiling point of 57° C. at 5.5 millimeters Hg ($n$ 30/$D$=1.5193). Analyses for carbon and hydrogen—calcd: C, 80.56%; H, 7.51%. Found: C, 80.50%; H, 7.64%. Thus a yield of 57.5 percent of the desired product was realized.

*Example X.—Preparation of 6-(methylglycidyloxy)-3-oxatricyclo[3.2.1.0$^{2,4}$]octane*

A weight of 12.5 grams (0.545 mole) of sodium was allowed to react with 60 grams (0.545 mole) of 5-hydroxybicyclo [2.2.1]-2-heptene in 800 grams of dry tetrahydrofuran at reflux temperature. Then, at the same temperature, a weight of 181 grams (2.0 moles) of methallyl chloride was added to the reaction mixture. After 3 hours of continued heating at reflux, the reaction mixture was filtered and subsequently distilled to provide a mixture of starting alcohol and its methallyl ether derivative. The product mixture was dissolved in 300 grams of toluene in which 12 grams of boric acid was dispersed, after which the resulting mixture was slowly distilled on a short packed column. When no further toluene-water azeotrope appeared, the remaining solution was subjected to reduced pressure fractionation. There was obtained at the still head a weight of 12 grams of 5-methallyloxybicyclo [2.2.1]-2-heptene at a boiling point of 94° C. at 20 millimeters Hg ($n$ 30/$D$=1.4760). Analysis for carbon and hydrogen content showed—for carbon: 79.87% (calcd. 80.44%); for hydrogen: 9.53% (calcd. 9.83%).

A weight of 9 grams (0.055 mole) of the above diolefin was mixed with 44 grams (0.140 mole) of peracetic acid solution (24.4 percent in ethyl acetate) over a 30-minute period. After 2 additional hours, analyses indicated that 95 percent of the theoretical amount of peracetic acid had been consumed. Distillation of the reaction mixture at reduced pressure gave 7.0 grams of 6-(methylglycidyloxy)-3-oxatricyclo[3.2.1.0$^{2,4}$]octane at a boiling point of 122° C. at 3.5 millimeters Hg ($n$ 30/$D$=1.4800). Analyses for carbon and hydrogen content agreed with the theoretical values—percent carbon, calcd.: 67.32%. Found: 67.55%. Percent hydrogen—calcd.: 8.22%. Found: 8.34%. This represented a yield of 65 percent of the theoretical.

*Example XI.—Preparation of 6-(3,4-epoxycyclohexy)-3-oxatricyclo[3.2.1.0$^{2,4}$]octane*

The diolefinic precursor, 5-(3-cyclohexenyl)bicyclo [2.2.1]-2-heptene, was prepared by the Diels-Alder condensation of vinylcyclohexene with cyclophentadiene as described in Ber., 71, 373 (1938).

To 118 grams of 5-(3-cyclohexenyl)bicyclo[2.2.1]-2-heptene which was maintained, with stirring, at 45° C. to 50° C. by means of an ice-water bath there was added dropwise over a period of 2 hours and 45 minutes 414 grams of a 27.5 percent solution of peracetic acid in ethyl acetate. After an additional hour and 40 minutes at 45° C. to 50° C. a titration for peracetic acid indicated that the reaction was complete. The volatiles were removed by co-distillation with ethylbenzene and the residue was flash-distilled to give 6-(3,4-epoxycyclohexyl)-3-oxatricyclo[3.2.1.0$^{2,4}$]octane as a colorless liquid, 114 grams having a boiling range of 153° C. at 2 millimeters Hg to 183° C. at 2.2 millimeters Hg.

*Analysis.*—Calcd. for $C_{13}H_{18}O_2$: C, 75.73%; H, 8.79%. Found: C, 75.74%; H, 8.86%.

*Example XII.*—*Preparation of 6 - vinyl - 3 - oxatricyclo [3.2.1.0²,⁴]octane and 6 - epoxyethyl - 3 - oxatricyclo [3.2.1.0²,⁴]octane*

The diolefinic precursor, 5-vinylbicyclo[2.2.1]-2-heptene, is a minor product formed in the condensation of butadiene with cyclopentadiene having the following properties: boiling point 137° C., $n\ 30/D = 1.4754$.

To 240 grams of 5-vinylbicyclo[2.2.1]-2-heptene which was maintained, with stirring, at 20° C. to 30° C. by means of an ice-water bath there was added dropwise over a period of an hour and a half 696 grams of a 27.2 percent solution of peracetic acid in ethyl acetate. After an additional hour at 20° C. to 30° C., a titration for peracetic acid indicated that 84 percent of the acid in the solution had reacted. The volatiles were removed by codistillation with ethylbenzene and the residue was fractionally distilled to give 149 grams of 6-vinyl-3-oxatricyclo [3.2.1.0²,⁴]octane as a colorless liquid, boiling point 58° C. at 5 millimeters Hg to 60° C. at 3 millimeters Hg ($n\ 30/D = 1.4878$–$1.4885$), and 33 grams of 6-epoxyethyl-3-oxatricyclo[3.2.1.0²,⁴]octane as a colorless liquid, boiling point 91° C. at 3 millimeters Hg;

($n\ 30/D = 1.4924$–$1.4925$)

What is claimed is:

1. A substituted 3-oxatricyclo[3.2.1.0²,⁴]octane selected from the group consisting of 6-methylene-3-oxatricyclo [3.2.1.0²,⁴]octane, 6,7-dimethylene - 3 - oxatricyclo[3.2.1. 0²,⁴]octane, 6 - chloromethyl-3-oxatricyclo[3.2.1.0²,⁴]octane, 6,7-dichloromethyl-3-oxatricyclo[3.2.1.0²,⁴]octane, 6,7 - dimethylene-3-oxatricyclo[3.2.1.0²,⁴]octane dioxide, 5,6-epoxy-4,7-methano-1-oxaspiro[2.5]octane and a compound represented by the formula:

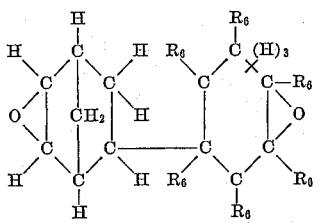

wherein $R_6$ is a member selected from the group consisting of hydrogen and alkyl of from 1 to 12 carbons.

2. 6,7 - dimethylene-3-oxatricyclo[3.2.1.0²,⁴]octane dioxide.
3. 6-chloromethyl-3-oxatricyclo[3.2.1.0²,⁴]octane.
4. 6-methylene-3-oxatricyclo[3.2.1.²,⁴]octane.
5. 5,6-epoxy-4,7-methano-1-oxaspiro[2.5]octane.
6. 6,7-di(chloromethyl) - 3 - oxatricyclo[3.2.1.0²,⁴]octane.
7. 6,7-dimethylene-3-oxatricyclo[3.2.1.0²,⁴]octane.
8. 6-(3,3-epoxycyclohexyl) - 3 - oxatricyclo[3.2.1.0²,⁴] octane.
9. A process for the production of a methylene-substituted 3-oxatricyclo[3.2.1.0²,⁴]octane which comprises contacting a chloromethyl-substituted bicyclo[2.2.1]-2-heptene selected from the group consisting of 5-chloromethylbicyclo[2.2.1]hept-2-ene and 5,6-di(chloromethyl) bicyclo[2.2.1]hept-2-ene with a peracid, recovering the resultant epoxy product, dehydrohalogenating said epoxy product and recovering the desired methylene-substituted 3-oxatricyclo[3.2.1.0²,⁴]octane.
10. A process for the production of 6-methylene-3-oxatricyclo[3.2.1.0²,⁴]octane which comprises contacting 5-chloromethylbicyclo[2.2.1]-2-heptene and a peracid, recovering the resultant epoxy product 6-chloromethyl-3-oxatricyclo[3.2.1.0²,⁴]octane, dehydrohalogenating said epoxy product and recovering 6-methylene-3-oxatricyclo [3.2.1.0²,⁴]octane.
11. A process for the production of 6,7-dimethylene-3-oxatricyclo[3.2.1.0²,⁴]octane which comprises contacting 5,6-di(chloromethyl)bicyclo[2.2.1]-2-heptene with a peracid, recovering the resultant epoxy product 6,7-di (chloromethyl)-3-oxatricyclo[3.2.1.0²,⁴]octane, dehydrohalogenating said epoxy product and recovering 6,7-dimethylene-3-oxatricyclo[3.2.1.0²,⁴]octane.

References Cited by the Examiner

UNITED STATES PATENTS

| | | | |
|---|---|---|---|
| 2,826,556 | 3/1958 | Greenspan et al. | 260—2 |
| 2,848,426 | 8/1958 | Newey | 260—348 |
| 2,883,398 | 4/1959 | Frostick et al. | 260—348 |
| 2,890,209 | 6/1959 | Phillips et al. | 260—78.3 |
| 2,916,462 | 12/1959 | Korach | 260—348 |
| 2,925,403 | 2/1960 | Shokal | 260—348 |
| 2,962,453 | 11/1960 | Phillips et al. | 260—348 |
| 2,963,490 | 12/1960 | Rowland et al. | 260—348 |
| 2,967,840 | 1/1961 | Phillips et al. | 260—348 |
| 2,988,554 | 6/1961 | Batzer et al. | 260—348 |
| 3,014,048 | 12/1961 | Tinsley et al. | 260—348 |
| 3,043,813 | 7/1962 | Kilsheimer et al. | 260—348 |
| 3,057,880 | 10/1962 | Lynn et al. | 260—348 |
| 3,066,152 | 11/1962 | Luvisi | 260—348 |

FOREIGN PATENTS 788,123  12/1957  Great Britain.

WALTER A. MODANCE, *Primary Examiner.*

PHILLIP E. MANGAN, IRVING MARCUS, NICHOLAS S. RIZZO, JOHN D. RANDOLPH,
*Examiners.*